United States Patent
Krampe

(10) Patent No.: US 6,220,119 B1
(45) Date of Patent: Apr. 24, 2001

(54) WIRE STRIPPER FOR SHEATHED ELECTRICAL CABLES

(76) Inventor: Josef Krampe, An der Vogelrute 32, D-59387, Ascheberg, 2 (DE)

( * ) Notice: Subject to any disclaimer, the term of this patent is extended or adjusted under 35 U.S.C. 154(b) by 0 days.

(21) Appl. No.: 09/171,816

(22) PCT Filed: Jan. 29, 1998

(86) PCT No.: PCT/EP98/00459

§ 371 Date: Oct. 27, 1998

§ 102(e) Date: Oct. 27, 1998

(87) PCT Pub. No.: WO98/38713

PCT Pub. Date: Sep. 3, 1998

(30) Foreign Application Priority Data

Feb. 27, 1997 (DE) .............................................. 197 07 739

(51) Int. Cl.[7] .................................................... H02G 1/12
(52) U.S. Cl. ............................................ 81/9.43; 81/9.41
(58) Field of Search .................................... 81/9.41, 9.42, 81/9.43

(56) References Cited

U.S. PATENT DOCUMENTS 3,221,576 * 12/1965 Goetz ..................................... 81/9.43
3,311,001    3/1967 Gallagher .
5,713,249 * 2/1998 Liversidge ............................. 81/9.43

FOREIGN PATENT DOCUMENTS 85176656   10/1985 (DE) .
 1142602    2/1969 (GB) .

* cited by examiner

Primary Examiner—James G. Smith
(74) Attorney, Agent, or Firm—Browdy and Neimark

(57) ABSTRACT

Stripping tongs for sheathed electrical cables (K) have two tong arms (1, 2) that can pivot toward one another about a common pivoting shaft (3), counter to a restoring spring the tongs further having cable cross-cutters (4, 5) and cuting blades (6, 7) with associated clamping jaws (8, 9) for stripping cable. The cable cross-cutters (4, 5) and the cutting blades (6, 7) with the associated clamping jaws (8, 9) are disposed adjacently and parallel to one another with spacing, and lie in the common tong closing and opening plane extending transversely to the pivoting shaft (3).

15 Claims, 5 Drawing Sheets

Figure 1:
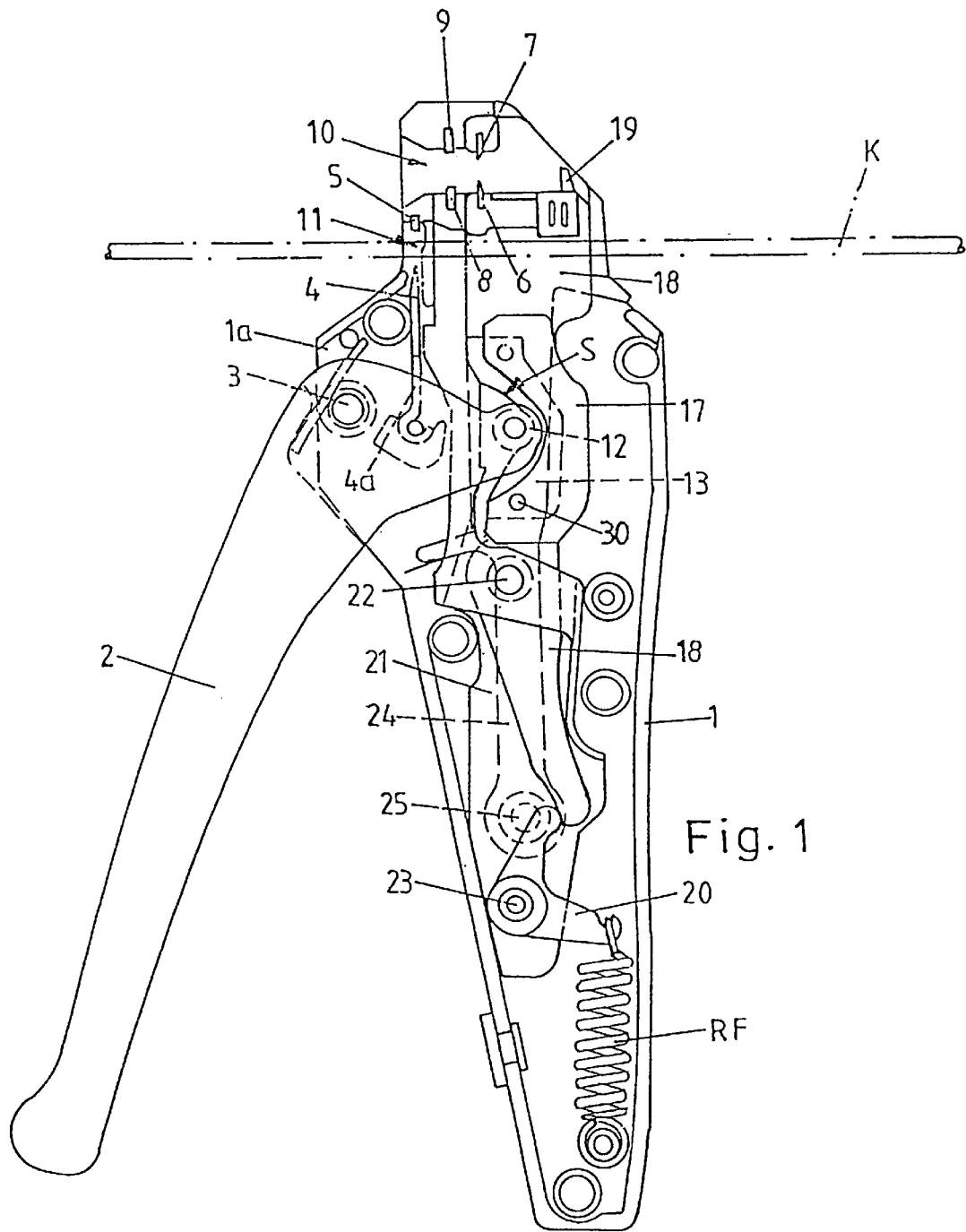

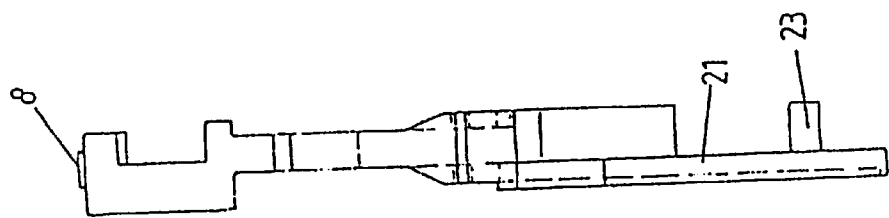
Fig. 12
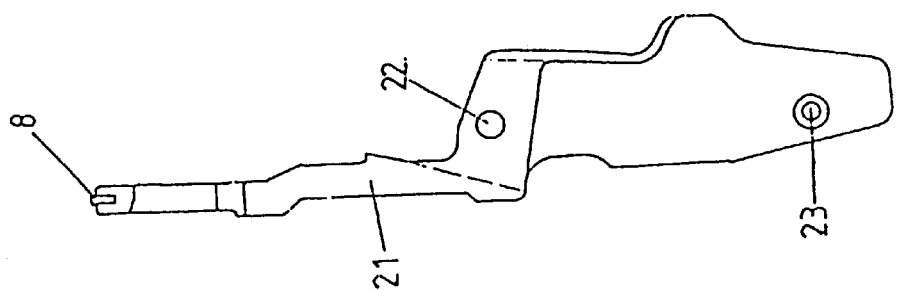
Fig. 11
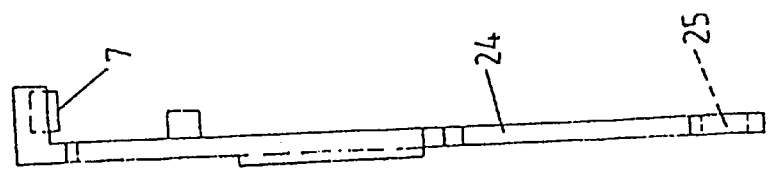
Fig. 10
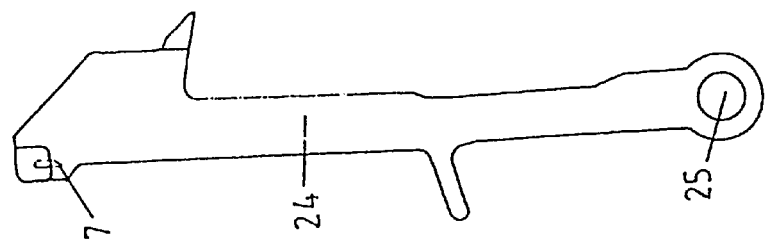
Fig. 9
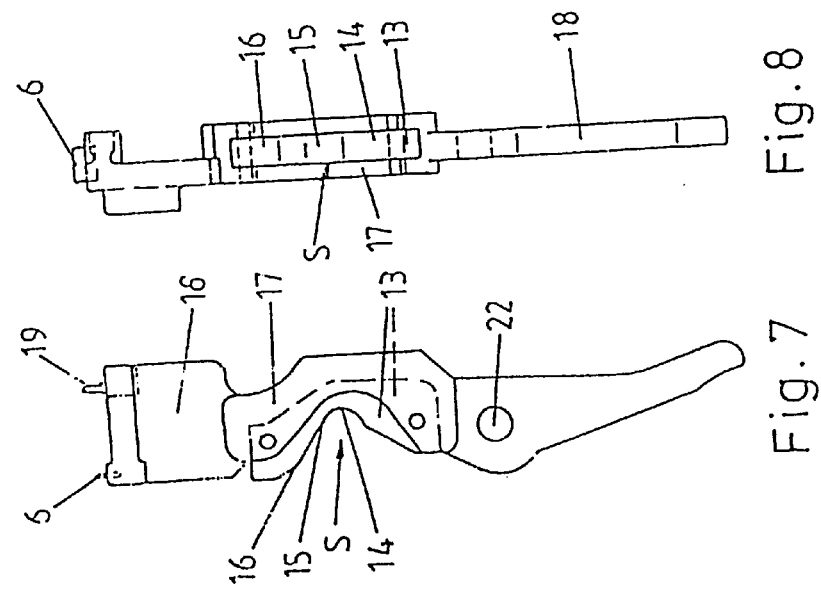
Fig. 8
Fig. 7

WIRE STRIPPER FOR SHEATHED ELECTRICAL CABLES

The invention relates to stripping tongs for sheathed electrical cables, having two tong arms that pivot toward one another, counter to a restoring spring, about a common pivoting shaft, the arms having cable cross-cutters and cutting blades with associated clamping jaws for stripping cables.

Stripping tongs of this type are known, for example, from DE-GM 85 17 665, in which the cross-cutters are spaced beneath the pivoting shaft of the tong arms and the stripping blades and the clamping jaws are spaced above the pivoting shaft of the tong arms.

In these tongs, the cable is inserted in the longitudinal direction of the tong-arm pivoting shaft for the purpose of cross-cutting, and the cable is then inserted into the clamping jaws and cutting blades transversely to the longitudinal axis for stripping, so the tongs must be exchanged during operation, or the insertion direction of the cable must be changed, both of which are laborious processes.

The transfer path of the cable from cross-cutting to stripping is relatively large, and the operating personnel must either rotate the tongs in an awkward fashion or transfer the cable to the angular position in a disadvantageous manner, which is an impractical work method.

Furthermore, the cutting blades for stripping the cable are not protected against damage in the case of harder sheaths; rather, an excessive pressure is exerted, which causes damage and therefore has a negative impact on the service life of the cutting blades.

It is the object of the invention to provide stripping tongs constructed in the manner described at the outset, which are equipped with cross-cutting and stripping means that are in a favorable spatial arrangement and permit comfortable insertion of the cable on a short path, the tongs further allowing fast, reliable cross-cutting and stripping without stressing the blades.

In accordance with the invention, this object is accomplished by the characterizing features of claim 1.

The dependent claims disclose design features that represent advantageous and beneficial modifications of the solution to the object.

The stripping tongs of the invention possess a spatially-advantageous arrangement of cross-cutting and stripping means that permit a short cable-insertion path, and assure fast, reliable cross-cutting and stripping of cables without stressing the blades.

The cable cross-cutters and the stripping blades and their associated clamping jaws are disposed closely together, and in the same cable feed-in or insertion plane in the stripping tongs, so while the stripping tongs are being held, the cable can be laid in the same direction in the tongs for both functions.

The sheathed cable is cross-cut from a roll by two knife-like cross-cutters that can be displaced toward one another, and the cables are stripped by clamping jaws that can be moved toward one another and two cutting blades that can be moved toward one another, which blades first cut into to the cable and then pull off the stripped sheath region by pivoting in the longitudinal direction of the cable.

The motion of the clamping jaws and the cutting blades is controlled by the second tong arm by way of a pressure roller and a curved piece that is disposed in the first tong arm and releases the clamping jaws and knife blades immediately following stripping, so the cable can be removed immediately from the tongs. This effects extremely fast and efficient cable stripping.

Moreover, the curved piece in the holder is disposed to pivot to a limited extent, and is spring-loaded. With stronger cable sheath material, greater pressure must be exerted on the two tong arms for stripping, because the blades cannot perform the stripping and clamp the cable inside themselves. Then the spring is activated in that, because the pressure roller is running in the control path of the curved piece, the roller is in an unfavorable position with respect to the curved path, causing excessive pressure, so that the prestressing of the compression spring, which is set for normal stripping, is exceeded, which makes the spring yield and allows the curved piece to recede into the holder; through angular pivoting, this curved piece can roll back via the pressure roller and pivot back, which immediately releases the cable that has not yet been stripped. This process is gentle on the cutting blades, and does not damage them. When the pressure exerted by the tong arms is excessive during stripping, and the tongs could become damaged by the harder sheath material, the spring thus releases the curved path immediately.

For moving the curved piece, and for the arrangement of the cross-cutters and cutting blades with clamping jaws, one tong arm includes levers that are actuated by the pressure roller of the second tong arm and perform the displacement and pivoting movements. The tong arm having the pressure roller need only be moved toward the tong arm embodied as the main arm, and the cross-cutting and stripping processes are performed automatically. The tong arm that receives the levers with the curved pieces and the cutting edges and clamping jaws is preferably box-shaped, and is closed with a removable lid up to the feed-in guides for the cable for cross-cutting and stripping. Because of its box shape, this tong arm can be made of plastic, and possesses a very high stability. Because of the arrangement of the cross-cutting and stripping means with respect to one another, and the control of these parts by the curved piece and the levers, the stripping tongs have a high service value, and enable efficient cross-cutting and stripping of sheathed cables while offering extremely comfortable handling.

In addition, the fact that the stripping tongs are largely produced from plastic makes them far more lightweight than conventional metal tongs and, again, improves handling. The use of plastic in the stripping tongs also allows them to be manufactured more simply and at lower cost.

Figure 2:
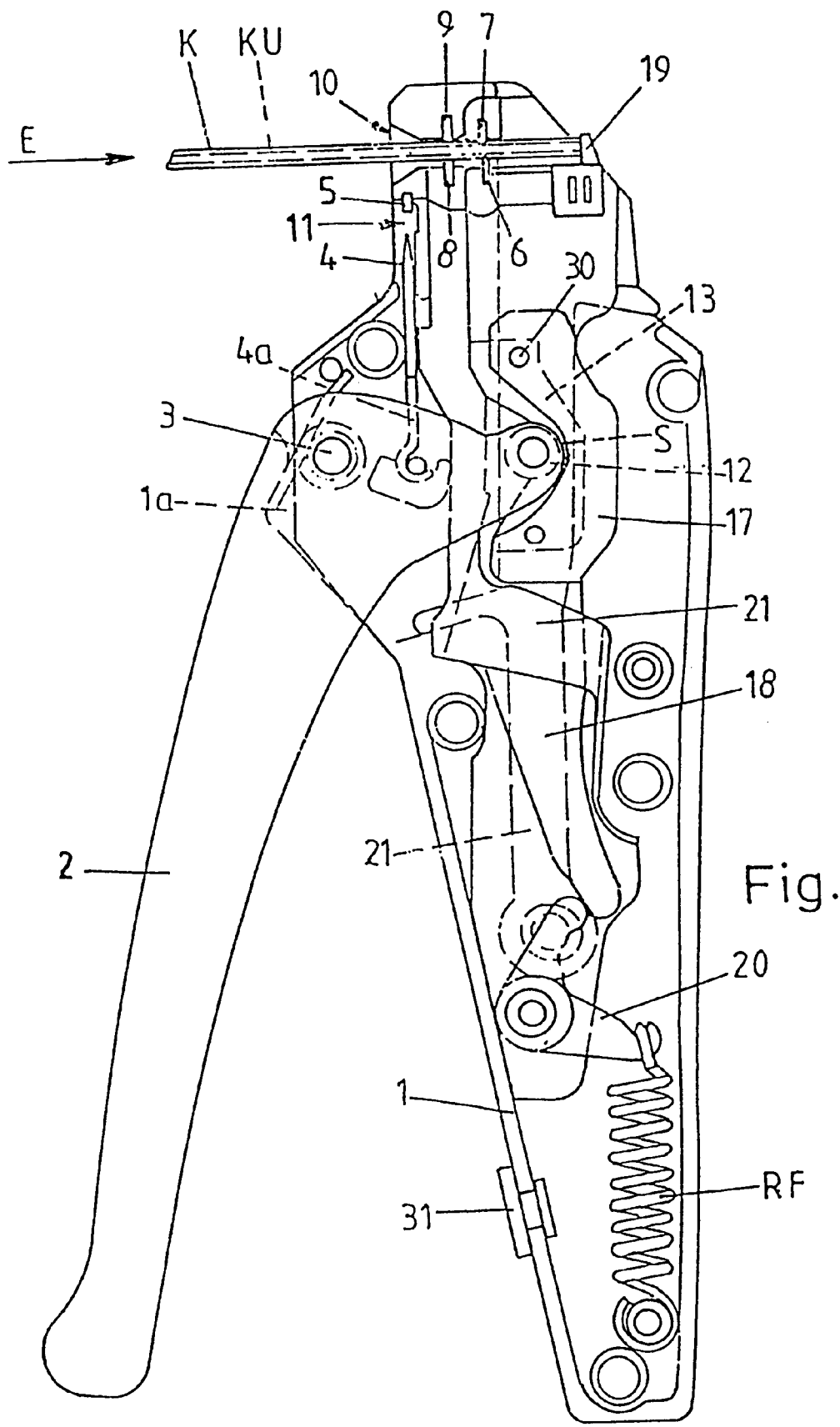
Figure 3:
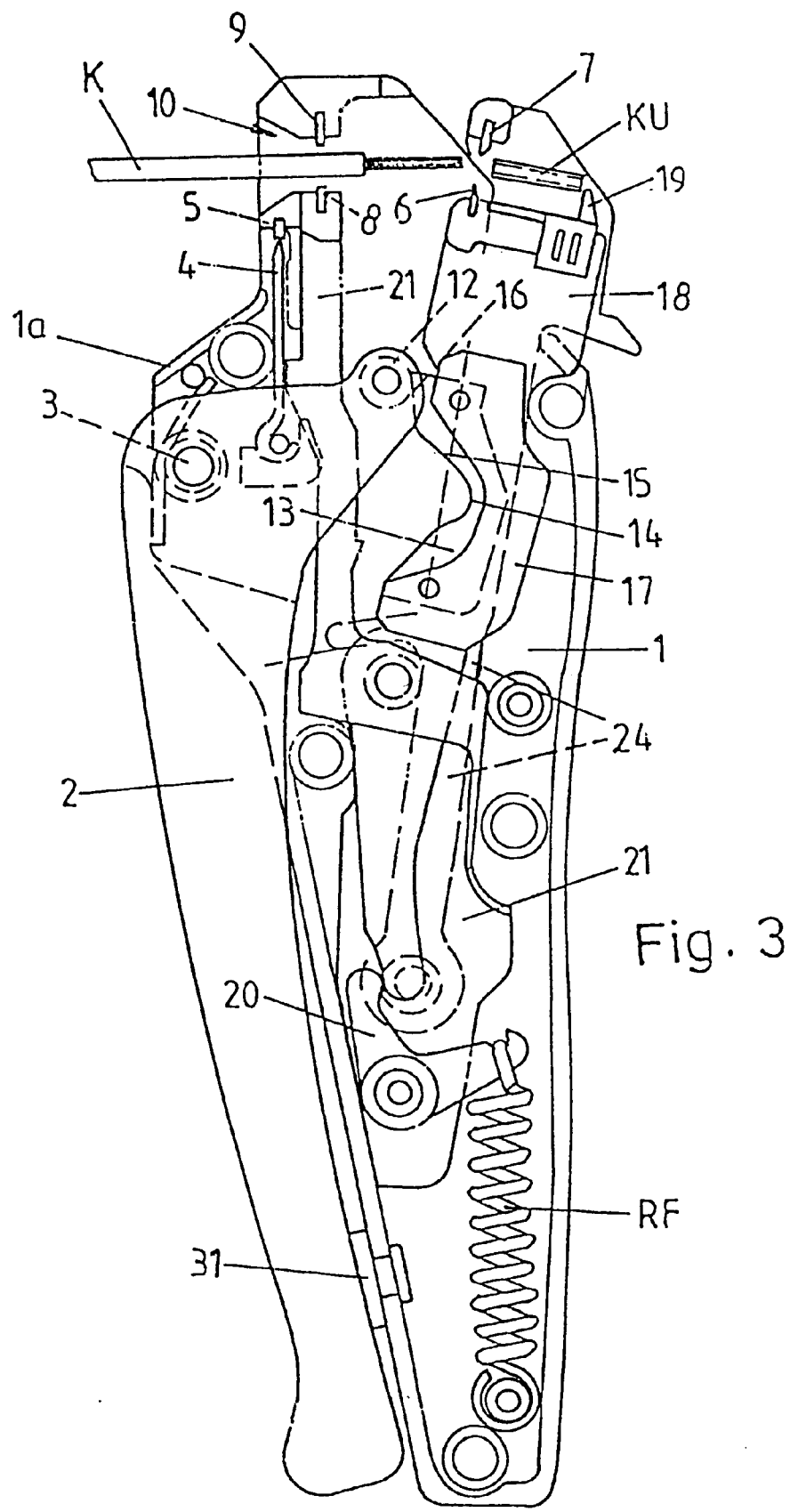
Figure 6:
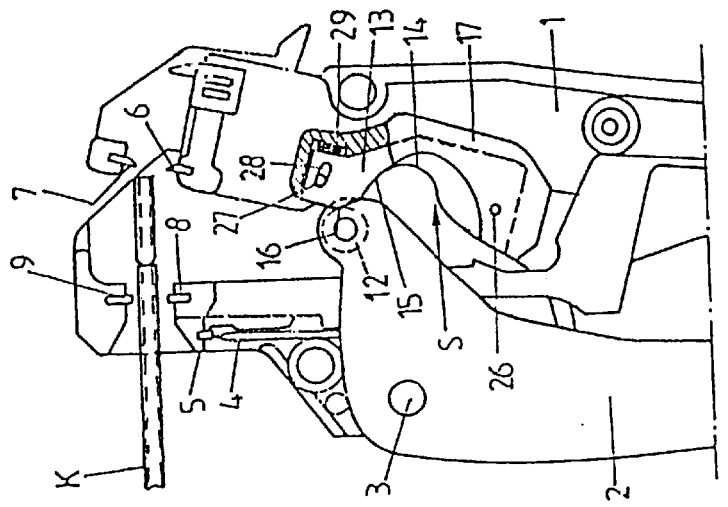
Figure 5:
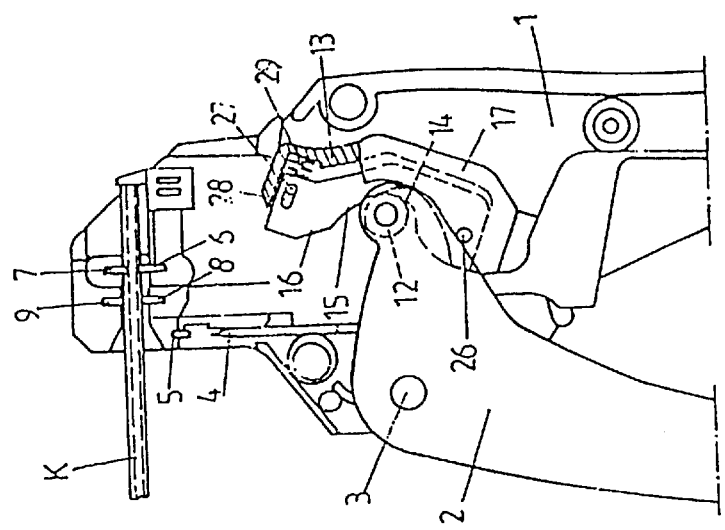
Figure 4:
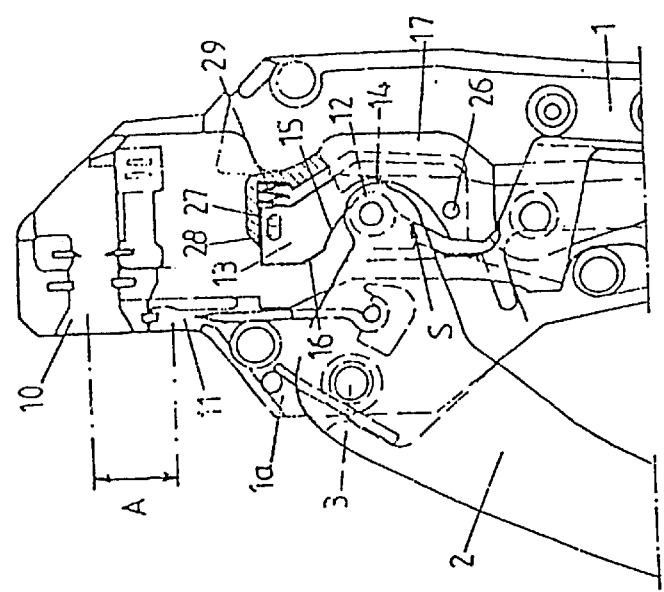

The drawings illustrate an embodiment according to the invention, which is explained in detail below. Shown are in:

FIG. 1 a plan view of a pair of stripping tongs having two tong arms, cross-cutters and cutting blades with clamping jaws and a curved piece and levers, in the initial position with a cable inserted into a cross-cutting guide and with the lid removed;

FIG. 2 a plan view of the same tongs, with a cable inserted for stripping;

FIG. 3 a plan view of the same tongs in the post-stripping tong position;

FIGS. 4–6 plan views of a partial region of the tongs with a pivotable and spring-loaded curved piece, in the initial position (FIG. 4), in the clamped position during stripping (FIG. 5) and in the deflected position of the curved piece for releasing the cable (FIG. 6);

FIGS. 7–12 a plan view and associated side views of three tong levers.

The stripping tongs for sheathed (provided with an insulation KU) electrical cables (K) has two tong arms (1, 2) that can pivot toward one another about a common pivoting shaft (3), counter to a restoring spring (4), and have cable cross-cutters (4, 5) and cutting blades (6, 7) with associated clamping jaws (8, 9) for cable stripping. The tong arm (1) forms the main arm, which receives all of the components and also holds the second tong arm (2) so that it can pivot; the second tong arm (2) forms the handle. The cable cross-cutters (4, 5) and the cutting blades (6, 7) with the associated clamping jaws (8, 9) are adjacent and spaced one above the other at a distance (A) in the longitudinal direction of the tongs, and parallel to one another in the common tong closing and opening plane extending transversely to the pivoting shaft (3).

The cutting blades (6, 7) with the associated clamping jaws (8, 9) and the cross-cutters (4, 5) form between themselves parallel cable feed-in guides (10, 11) that receive the cables (K) to be cross-cut and stripped from the same insertion side (E) oriented transversely to the pivoting shaft (3), these guides extend transversely, preferably perpendicular, to the longitudinal direction of the tong arm (1) and in the width of the tong arm.

In the cable insertion direction (E), the clamping jaws (8, 9) are spaced in front of the cutting blades (6, 7), and the cross-cutters (4, 5) are spaced in front of the clamping jaws (8, 9).

The first tong arm (1) may be considered as being divided into two tong arm segments, or legs: one shorter leg, which is upper in the drawing, and one longer leg, which is depicted below. The division is approximately at the longitudinal location of the lateral tong-arm extension (1a) which contains the pivoting shaft (3). The cutting blades (6, 7) with the clamping jaws (8, 9) and the cross-cutters (4, 5) are disposed in the shorter leg of the tong arm (1). The clamping jaws (8, 9) and the cross-cutters (4, 5) are set one behind the other in the longitudinal direction of the tong arm (1) and the shorter leg, and spaced from the pivoting shaft (3) along a direction transverse to the longitudinal direction of the shorter leg and the arm (1). The feed-in guides (10, 11) are therefore in an end region of the tong arm (1).

At the tong arm (1) that has the cutting blades (6, 7) with the clamping jaws (8, 9) and the cross-cutters (4, 5), the second tong arm (2) is held about the pivoting shaft (3), which is located in a lateral tong-arm extension (1a). The tong arm (2) cooperates with a pressure roller (12) that is spaced from the pivoting shaft (3) and has a displaceable and pivotable curved piece (13) that is coupled to the cutting blades (6, 7) and the clamping jaws (8, 9).

The curved piece (13) has a control path (S) that is formed from an inward-oriented partial-circle curve (14), an outward-extending, shallow curve (15) adjoining the partial-circle curve in the direction of the cross-cutters (4, 5), and an oblique curve (16) that extends outward and in the direction of the cross-cutters (4, 5).

The curved piece (13) is positioned or held in a holder (17), for example by pins (30) in the holder (17). The holder (17) is mounted or formed on a double-armed, longitudinally-displaceable and transversely-pivotable pushing and pivoting lever (18). This first lever (18) has at one lever end a cutting blade (6) and a longitudinal stop (19) for the cable (K) to be stripped; at the other longitudinal end, this lever (18) is coupled to the restoring spring (RF4), preferably a tension spring, by way of a bell-crank lever (20). The lever (18) having the curved piece (13) is clearly visible in FIGS. 7 and 8.

The pushing and pivoting lever (18) is seated on a second pushing lever (21) in the pivoting shaft (22) so as to be longitudinally displaced with the second lever and laterally pivoted away (transversely) from it.

This second pushing lever (21) supports at one longitudinal end the clamping jaw (8) that cooperates with the stationary counter-clamping jaw (9) fixed on the tong arm (1), with the clamping jaw (8) being displaced toward the fixed clamping jaw (9). Furthermore, this pivoting lever (21) receives the bell-crank lever (20) such that the bell-crank lever pivots about a pin (23) provided in the other longitudinal end. This pivoting lever (21) is clearly visible in FIGS. 11 and 12. A third pivoting lever (24), which can pivot by one end about a pivoting shaft (25), is disposed beneath the pushing and pivoting lever (18) and next to and partially beneath the pushing lever (21); the pushing and pivoting lever (18) is displaceably guided in the longitudinal direction with respect to the pivoting lever (24); the pivoting lever (24) has at its other longitudinal end the counter-cutting blade (7), with respect to which the cutting blade (6) is displaced, and both cutting blades (6, 7) are pivoted for stripping.

The pivoting lever (24) is clearly visible in FIGS. 9 and 10.

In a preferred variation, the curved piece (13) is seated at one end in the holder (17) so as to pivot about a pivoting shaft (26), and at the other end in a pin-slot guide (27, 28) so as to pivot to a limited extent, and is acted upon by a compression spring (29). When the cutting blades (6, 7) exert a higher pressing pressure on the cable (K) to be stripped, the compression spring (29) permits the curved piece (13) to recede into the curved-piece holder (17) and move back via the pressure roller (12), thereby opening the cutting blades (6, 7) with the clamping jaws (8, 9) and releasing the cable (K). When the pressing pressure is increased, the pressure roller (12) is positioned against the oblique curve (16), and the curved piece (13) can change its angular position by means of the compression spring (29).

The pivoting shaft (26) of the curved piece (13) is disposed in the end facing away from the feed-in guides (10, 11), with parallel spacing from the pressure roller (12), and the slot (28) with the pin (27) and the compression spring (29) are disposed in the end of the holder (17) facing away from the feed-in guides (10, 11); the slot (28) extends in the transverse pivoting direction of the curved piece (13).

The cross-cutter (5) is fixedly held on the tong arm (1), and the second cross-cutter (4) is displaceably guided 15 in the tong arm (1), and is longitudinally displaced via a pushing rod (4a) hinged in the tong arm (2) when the tong arm (2) is pivoted.

The tong arm (1) that receives the levers (18, 20, 21, 24), the tension spring (4-) and the curved piece (13) is box-shaped and is closed up to the cable feed-in guides (10, 11) by a removable lid, not shown.

The box-shaped tong arm (1), its lid and the second tong arm (2) forming a handle are produced in one piece from plastic.

For cross-cutting a cable (K) from a roll, the cable is laid in the feed-in guide (11) and severed by the meeting of the cross-cutters (4, 5).

For stripping, the cable (K) is laid in the feed-in guide (10) until it is in front of the stop (19), and the tong arms (1, 2) are pivoted together, with the clamping jaws (8, 9) holding the cable (K) in position and the cutting blades (6, 7) cutting through the cable sheath (KU). The pressure roller (12) of the tong arm (2) acts on the curved piece (13) during pivoting, and pivots it, with the lever (18), laterally away from the clamping jaws (8, 9), so the cable sheath (KU) is removed from the cable wire. If the pressure roller (12) has run up to the curve (16) in the control path (S), the tong arm (2) impacts a stop (31) at the other tong arm (1), the stripping process is ended, and the tong arm (2) is relieved from pressure, so the lever (18) and the curved piece (13) can move back and pivot back, releasing the stripped cable (K).

In the pivotable variation of the curved piece (13), the compression spring (29) has a certain prestressing that corresponds to (opposes) normal stripping tension, and does not permit inward pivoting of the curved piece (13). If the cable sheath is harder, the pressure on the tong arms (1, 2) is greater, but stripping cannot occur, so the cable (K) remains wedged between the blades (6, 7). In this situation, the pressure roller (12) is in a disadvantageous position with respect to the-control path (S), namely the pressure roller (12) rests against the curve (15) and continues to exert a pressure on the curve (15) and blocks the curved piece (13) in its position (FIG. 5).

Now the compression spring (29) becomes active; it is compressed by the increased pressure above the prestressing, and pivots the curved piece (13) by the length of the slot (28) into the holder (17), so the pressure roller (12) can move (pivot further) into the region of the curve (16) and the curved piece (13) can move back via the pressure roller (12), causing the blades (6, 7) and clamping jaws (8, 9) to open and release the unstripped cable (K) (FIG. 6). The curved piece (13) returns to its initial position (FIG. 4), and the tong arm (2) is relieved of pressure.

The pivoting path of the curved piece (13) is determined by the length of the slot (28), and in the initial position the pin (27) rests against one slot end (on the right in FIG. 4), and in the inward-pivoted position, the curved piece lies against the other slot end (on the left in FIG. 6).

What is claimed is:

1. Stripping tongs, for cutting a sheathed electrical cable (K) or stripping a sheath (KU) therefrom; the tongs comprising:
    a first tong arm (1) defining a longitudinal direction;
    a second tong arm (2), pivotably coupled to the first tong arm about a common arm pivoting shaft (3);
    a restoring spring (RF) countering a closing motion of the second tong arm toward the first tong arm;
    the closing motion defining a common tong closing and opening plane extending transversely to an axis of the arm pivoting shaft (3);
    cross-cutters (4, 5), operated by the closing motion;
    clamping jaws (8, 9) and sheath-cutting blades (6, 7) associated therewith for stripping the cable, operated by the closing motion;
    wherein the sheath-cutting blades (6, 7) and the clamping jaws (8, 9) are disposed parallel to the cross-cutters (4, 5) and are spaced at a distance (A) therefrom, and
    wherein the sheath-cutting blades (6, 7), the clamping jaws (8, 9), and the cross-cutters (4, 5) lie in the tong closing and opening plane.

2. The tongs according to claim 14, comprising:
    parallel cable feed-in guides (10, 11) further comprising a first cable feed-in guide (11) guiding between the cross-cutters (4, 5) and a second cable feed-in guide (10) guiding between the sheath-cutting blades (6, 7) and between the clamping jaws (8, 9);
    the feed-in guides selectively receiving the cable (K)
    from an insertion side, along a cable insertion direction (E), the insertion direction being oriented transversely both to the axis of the arm pivoting shaft (3) and to the longitudinal direction of the tong arms.

3. The tongs according to claim 1:
    wherein, along a cable insertion direction (E), oriented transversely both to the axis of the arm pivoting shaft (3) and to the longitudinal direction of the tong arms, the clamping jaws (8, 9) are closer to an insertion side than are the sheath-cutting blades (6, 7); and
    wherein, along the insertion direction, the cross-cutters (4, 5) are closer to the insertion side than are the clamping jaws (8, 9).

4. The tongs according to claim 1,
    wherein the first tong arm (1) comprises a longer tong arm segment below the common arm pivoting shaft (3), and a shorter tong arm segment above the common arm pivoting shaft (3);
    wherein the sheath-cutting blades (6, 7), the clamping jaws (8, 9), and the cross-cutters (4, 5) are disposed, in the shorter tong arm segment of the first tong arm (1) and are distant from the arm pivoting shaft (3); and
    wherein the sheath-cutting blades (6, 7) and the clamping jaws (8, 9) are spaced one behind another along the longitudinal direction of the first tong arm.

5. The tongs according to claim 1,
    wherein the tong arm (1) comprises the sheath-cutting blades (6, 7), the clamping jaws (8, 9), the cross-cutters (4, 5), and a lateral tong-arm extension (1a);
    wherein the arm pivoting shaft (3) is disposed in the lateral tong-arm extension (1a); and
    wherein the second tong arm (2) comprises a pressure roller (12) spaced from the arm pivoting shaft (3), the pressure roller bearing on a displaceable and pivotable curved piece (13) coupled to the sheath-cutting blades (6, 7) and to the clamping jaws (8, 9).

6. The tongs according to claim 5, wherein the curved piece (13) comprises a groove-shaped control path (S) further comprising path segments including:
    an inward-oriented partial-circle curve (14);
    an outwardly-extending, shallow bow curve (15) adjoining the partial-circle curve and extending generally toward the cross-cutters (4, 5); and
    an outwardly-extending oblique curve (16) adjoining the shallow bow curve and extending generally toward the cross-cutters (4, 5).

7. The tongs according to claim 5, comprising
    a double-armed, longitudinally-displaceable and transversely-pivotable pushing-and-pivoting first lever (18) including a first longitudinal end and a second longitudinal end;
    the first longitudinal end including a cutting blade (6) and a longitudinal stop (19) for the cable (K) to be stripped, and the second longitudinal end being coupled, by way of a bell-crank lever (20), to the restoring spring (RF);
    and wherein the curved piece (13) is fixedly held in a holder (17) which is mounted or formed on the pushing-and-pivoting first lever (18).

8. The tongs according to claim 7, wherein:
    the pushing-and-pivoting first lever (18), being seated on a second pushing lever (21) via a pivoting second shaft (22), whereby the pushing-and-pivoting first lever (18) is longitudinally displaced from the second pushing lever and laterally pivotable away therefrom;
    the second pushing lever (21) supporting at one lever end thereof a movable one of the clamping jaws (8);
    the movable one of the clamping jaws (8) being displaceable toward a counter-clamping stationary one of the clamping jaws (9) fixed on the tong arm (1) and cooperating therewith;
    the second pushing lever (21) comprising at another lever end thereof a pin (23) whereon the bell-crank lever (20) pivots;
    a third pivoting lever (24), end-pivotable about a third pivoting shaft (25), is disposed beneath the pushing and pivoting lever (18) and next to and partially beneath the pushing lever (21);

wherein the pushing-and-pivoting lever (18) is displaceably guided with respect to the pivoting lever (24) in the longitudinal direction, and is pivotable with respect to the pivoting lever laterally away from the pushing lever (21); and the pivoting lever (24) including, at a opposite end opposite the pivoting shaft (25), a movable one of the sheath-cutting blades (7), which is displaceable with respect to a stationary one of the sheath-cutting blades (6), and both sheath-cutting blades (6, 7) are pivotable for stripping.

9. The tongs according to claim 5, comprising a compression spring (29), and wherein one curved-piece end of the curved piece (13) is pivotally seated in the holder (17) at a curved-piece pivoting shaft (26), and a second curved-piece end of the curved piece (13) is seated in a pin-slot guide (27, 28) so as to pivot thereabout to a limited extent, and is acted upon by the compression spring (29) exerting a higher pressing pressure on the cable (K) to be stripped when the sheath-cutting blades (6, 7) cause the curved piece (13) to recede into the curved-piece holder (17) and move back via the pressure roller (12) to open the sheath-cutting blades (6, 7) with the clamping jaws (8, 9) and release the cable (K).

10. The tongs according to claim 9, comprising:

parallel cable feed-in guides (10, 11) further comprising a first cable feed-in guide (11) formed between the cross-cutters (4, 5) and a second cable feed-in guide (10) formed between the sheath-cutting blades (6, 7) and the clamping jaws (8, 9);

wherein the one curved-piece end of the curved piece (13), wherein the pivoting shaft (26) is disposed, faces away from the feed-in guides (10, 11), comprising a parallel spacer from the pressure roller (12), wherein a compression spring (29), a slot (28) of the pin-slot guide (26, 27), and a pin (27) of the pin-slot guide (26, 27), are disposed in the end of the holder (17) facing the feed-in guides (10, 11), and wherein the slot (28) extends through the curved piece (13) in a transverse pivoting direction of the curved piece.

11. The tongs according to claim 8, wherein the first tong arm (1) contains therein the pushing-and-pivoting first lever (18), the bell-crank lever (20), the second pushing lever (21), and the third pivoting lever (24), and the curved piece (13), and wherein the first tong arm (1) is box-shaped and is closed up to the cable feed-in guides (10, 11) by a removable lid (RL).

12. The tongs according to claim 11, wherein the first tong arm (1), the lid (RL), and the second tong arm (2), are produced in unitary pieces from plastic.

13. The tongs according to claim 1, wherein one of the cross-cutters (5) is fixedly held to the tong arm (1) and another one of the cross-cutters (4) is displaceably guided in the tong arm (1) and is hinged to the tong arm (2) for a cutting displacement.

14. Stripping tongs, for cutting a sheathed electrical cable (K) or stripping a sheath (KU) therefrom; the tongs comprising:

a first tong arm (1) defining a longitudinal direction;

a second tong arm (2), pivotably coupled to the first tong arm about a common arm pivoting shaft (3);

a restoring spring (RF) countering a closing motion of the second tong arm toward the first tong arm;

the closing motion defining a common tong closing and opening plane extending transversely to an axis of the arm pivoting shaft (3);

cross-cutters (4, 5), operated by the closing motion;

clamping jaws (8, 9) and sheath-cutting blades (6, 7) associated therewith for stripping the cable, operated by the closing motion;

wherein the sheath-cutting blades (6, 7) and the clamping jaws (8, 9) are spaced at a distance (A) from the cross-cutters (4, 5) in the longitudinal direction; and wherein the cross-cutters (4, 5) are spaced ahead of the clamping jaws (8, 9) along an insertion direction of the electrical cable.

15. The tongs according to claim 14, wherein the cross-cutters (4, 5) are spaced ahead of the sheath-cutting blades (6, 7) along the insertion direction of the electrical cable.

* * * * *